US008917385B1

(12) United States Patent
Lietzke et al.

(10) Patent No.: US 8,917,385 B1
(45) Date of Patent: Dec. 23, 2014

(54) AUTOMATIC IDENTIFICATION OF VOLCANIC ASH PLUMES USING MEASURED SPECTRAL RADIANCE OVER A PLURALITY OF FIELD OF VIEWS

(71) Applicant: Exelis Inc., McLean, VA (US)

(72) Inventors: Christopher E. Lietzke, Fort Wayne, IN (US); Ronald J. Glumb, Fort Wayne, IN (US)

(73) Assignee: Excelis Inc., McLean, VA (US)

( * ) Notice: Subject to any disclaimer, the term of this patent is extended or adjusted under 35 U.S.C. 154(b) by 68 days.

(21) Appl. No.: 13/633,370

(22) Filed: Oct. 2, 2012

(51) Int. Cl.
*G01J 5/60* (2006.01)

(52) U.S. Cl.
USPC .......................................................... 356/45

(58) Field of Classification Search
USPC ......................................... 356/45; 250/338.5
See application file for complete search history.

(56) References Cited

U.S. PATENT DOCUMENTS

2013/0087708 A1* 4/2013 Tillotson .................... 250/338.5

OTHER PUBLICATIONS

Clarisse, et al., "Retrieving radius, concentration, optical depth, and mass of different types of aerosols from high-resolution infrared nadir spectra", Jul. 1, 2010 / vol. 49, No. 19 / Applied Optics, (pp. 3713-3722).
Hillger, D.W., and J.D. Clark, 2002: Principal Component Image analysis of MODIS for volcanic ash, Part-1: Most important bands and implications for future GOES Imagers, J. Appl. Meteor., 41(10),985-1001.
Hillger, et al. "Principal Component Image Analysis of MODIS for Volcanic Ash. Part II: Simulation of Current GOES and GOES-M Imagers", Journal of Applied Meteorology, vol. 41 (pp. 1003-1010), 2002.
Clarisse, et al., "A correlation method for volcanic ash detection using hyperspectral infrared measurements", Geophysical Research Letters, vol. 37, L19806, (5 pages), 2010.
Gangale, "The infrared spectral signature of volcanic ash determined from high-spectral resolution satellite measurements", Remote Sensing of Environment 114 (2010) (pp. 414-425).
Zhou, et al., "How well can infrared sounders observe the atmosphere and surface through clouds?", (9 pages), 2011.
Pavolonis, et al., "A Daytime Complement to the Reverse Absorption Technique for Improved Automated Detection of Volcanic Ash", Journal of Atmospheric and Oceanic Technology, vol. 23, (pp. 1422-1444), 2006.
Early Checkout of the Cross-track Infrared Sounder (CrIS) on Suomi-NPP (pp. 10-13), 2012.
Hillger, et al., "Detection of Important Atmospheric and Surface Features by Employing Principal Component Image Transformation of GOES Imagery", ournal of Applied Meteorology, vol. 42, (pp. 611-629), 2003.

* cited by examiner

*Primary Examiner* — Tarifur Chowdhury
*Assistant Examiner* — Jamil Ahmed
(74) *Attorney, Agent, or Firm* — Edell, Shapiro & Finnan, LLC (57) ABSTRACT

Volcanic ash is identified within a field of regard (FOR) by obtaining spectral radiance data comprising brightness temperature values over a specified spectral range for each field of view (FOV) within the FOR, determining a baseline brightness temperature value over the specified spectral range that is identified as representing no volcanic ash, and assigning one or more FOVs having brightness temperature values that deviate from the baseline brightness temperature value by a predetermined amount with an indication of containing volcanic ash.

19 Claims, 7 Drawing Sheets

AUTOMATIC IDENTIFICATION OF VOLCANIC ASH PLUMES USING MEASURED SPECTRAL RADIANCE OVER A PLURALITY OF FIELD OF VIEWS

GOVERNMENT LICENSE RIGHTS

This invention was made with government support under Contract Number NNG10XA06C awarded by National Aeronautics and Space Administration. The government has certain rights in the invention.

BACKGROUND

Volcanic ash observations using hyperspectral infrared sounders such as IASI (Infrared Atmospheric Sounding Interferometer) and visible/infrared imagers like GOES (Geostationary Operational Environmental Satellites) are known. However, both IASI and GOES are limited in the information they provide. For example, IASI is somewhat limited in that it provides spatial under-sampling of data, while GOES provides spectral under-sampling. This can be problematic in distinguishing between actual volcanic ash within plumes and, e.g., dust clouds (e.g., from desert environments) and/or other types of soil-based aerosol suspensions.

It is desirable to provide spectral measurement techniques useful for accurately determining the presence of volcanic ash plumes within a particular area or field of regard.

SUMMARY

In accordance with embodiments of the present invention, volcanic ash is identified within a field of regard (FOR), where the FOR includes a plurality of field of views. Spectral radiance data is obtained comprising brightness temperature values over a specified spectral range for each field of view (FOV) within the FOR, and a baseline brightness temperature value is determined over the specified spectral range that is identified as representing no volcanic ash. One or more FOVs is/are assigned having brightness temperature values that deviate from the baseline brightness temperature value by a predetermined amount with an indication of containing volcanic ash.

The techniques herein can be implemented within a system in which a processor (with one or more suitable software applications) is utilized to automatically determine the presence of volcanic ash as well as to further characterize identified volcanic ash with a FOR based upon the spectral radiance data obtained from a suitable source.

The above and still further features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION

In accordance with the present invention, a spectral analysis of brightness temperature values within a plurality of fields of view for a specified field of regard (FOR) is performed, where brightness temperature values are determined over a predetermined or specified spectral range for each field of view (FOV) within the FOR. A baseline brightness temperature value over the specified spectral range is determined as described herein, and this baseline value is designated as representing no volcanic ash plume. The brightness temperature values for one or more FOVs are compared with the baseline value, and a deviation from the baseline value that is more than a predetermined amount for brightness temperature values within an FOV indicates that this particular FOV contains volcanic ash plume. Further analysis of the brightness temperature values within FOVs determined to contain volcanic ash plume can determine an ash plume height (i.e., distance from ground level) within such FOVs.

Spectral analysis can be performed by any suitable instrument capable of measuring spectral radiance values over one or more predetermined or specified spectral ranges. In particular, a suitable instrument is provided that measures brightness temperature values within FOVs within a particular terrestrial region or FOR. One suitable instrument capable of providing measured spectral radiance values over suitable spectral ranges (e.g., including infrared spectral ranges), is the Crosstrack Infrared Sounder (CrIS) instrument, located on the Suomi-NPP satellite.

The CrIS instrument is capable of providing spectral radiance measurements over specific FORs, based upon the location of the Suomi-NPP satellite (operated by NOAA) with respect to the Earth at any given time. In particular, the CrIS instrument includes a Fourier transform spectrometer and scans a 2200 km swath width (+/−50 degrees), with 30 Earth-scene FORs. Each FOR consists of 9 FOVs, arrayed as 3×3 array of 14 km diameter sections. Thus, a FOR covers a three-dimensional section or window that is scanned by an instrument at a given time, and the FOR is divided into FOVs (9 FOVs for the CrIS instrument). For each FOV, interferograms are collected at different wavelength ranges. From such collected data, plots of brightness temperature (K)

(which provide an indication of the spectral radiance) are obtained over spectral ranges for the 9 FOVs within the FOR. The spectral radiance data plotted within the figures is obtained by the CrIS instrument. However, it is noted that any other suitable instrument (e.g., located within any other earth orbiting satellite) can also be utilized that is capable of measuring spectral radiance over specified spectral ranges (including infrared ranges) within a plurality of FOVs for a FOR.

Figure 1:
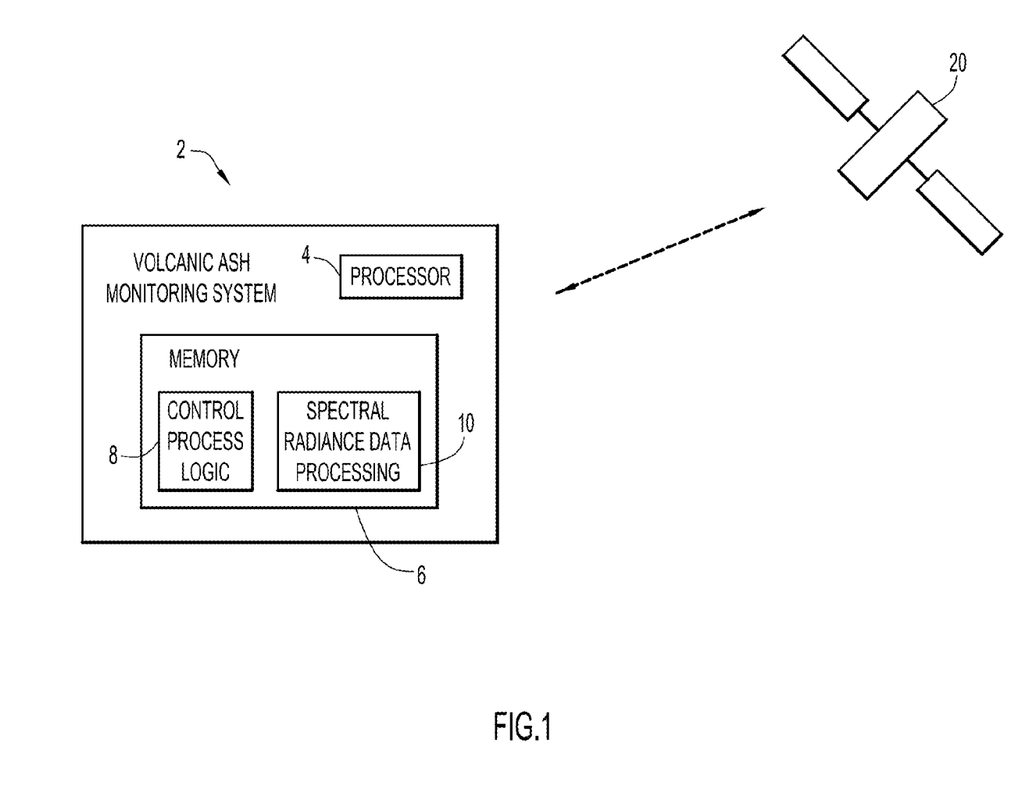
FIG. 1 is a schematic representation of a system that utilizes spectral measurements to accurately determine the presence and atmospheric height of a volcanic ash plume within a particular field of regard.

An example system for performing spectral radiance measurements over specified spectral ranges and analyzing the data to determine the presence of volcanic ash clouds within FOVs of a FOR in which the spectral radiance data is measured is depicted in FIG. 1. In particular, a volcanic ash monitoring system 2 includes a computing system for performing automatic monitoring within specified FORs, where the computing system comprises a processor 4 and memory 6.

The processor 4 comprises one or more microprocessors that execute control process logic instructions 8 stored within the memory 6, including operational instructions and software applications stored within the memory (including one or more software applications stored within a spectral radiance processing module 10 stored within memory 6).

The memory 6 can comprise any computer readable media including, without limitation, one or more of read only memory (ROM), random access memory (RAM), magnetic disk storage media devices, optical storage media devices, flash memory devices, electrical, optical, or other physical/tangible memory storage devices, and any combinations thereof. Thus, the computer readable medium within memory 6 comprises a computer readable storage medium, which is a tangible medium that can contain, or store a program for use by or in connection with an instruction execution system, apparatus, or device. The system can further provide a computer readable signal medium (which is different from a computer readable storage medium, i.e., a tangible storage medium) that provides instructions, e.g., to another system. A computer readable signal medium comprises a propagated data signal with computer readable program code embodied therein, for example, in baseband or as part of a carrier wave. Such a propagated signal may take any of a variety of forms, including, but not limited to, electro-magnetic, optical, or any suitable combination thereof. Thus, a computer readable signal medium may be any computer readable medium that is not a computer readable storage medium and that can communicate, propagate, or transport a program for use by or in connection with an instruction execution system, apparatus, or device.

In addition, it is noted that, while the system 2 is depicted as a single computing device, it can also include multiple computing devices, with multiple processors and/or memories in communication with each other and configured to perform the operations for automatic identification of volcanic ash clouds within specified regions of interest as described herein. The computing device(s) can further include any suitable input and/or output devices (e.g., one or more displays to display plots of spectral radiance data and/or images or other information, keyboards, mouse devices, touch pad or touch screen devices, etc.) that facilitate input and output of data associated with the techniques described herein and also any suitable communication devices (e.g., network interfaces such as modems, routers, satellite communication equipment, etc.) to facilitate communication of data with other devices in relation to techniques described herein.

The system 2 communicates, either directly or indirectly (i.e., via one or more other systems) with an earth orbiting satellite system generally depicted as satellite system 20 in FIG. 1. The satellite system 20 includes sensor equipment that measures spectral radiance information from different FORs, with a plurality of FOVs in each FOR, on the earth surface as the satellite orbits the Earth. As previously noted, an example satellite system that is useful and that is used to provide the spectral data plots in the figures is Suomi-NPP satellite system that includes the CrIS instrument which simultaneously measures spectral radiance information in 9 FOVs for each FOR, where the FOR changes as the satellite system moves to different orbiting positions with respect to the earth surface.

Figure 2:
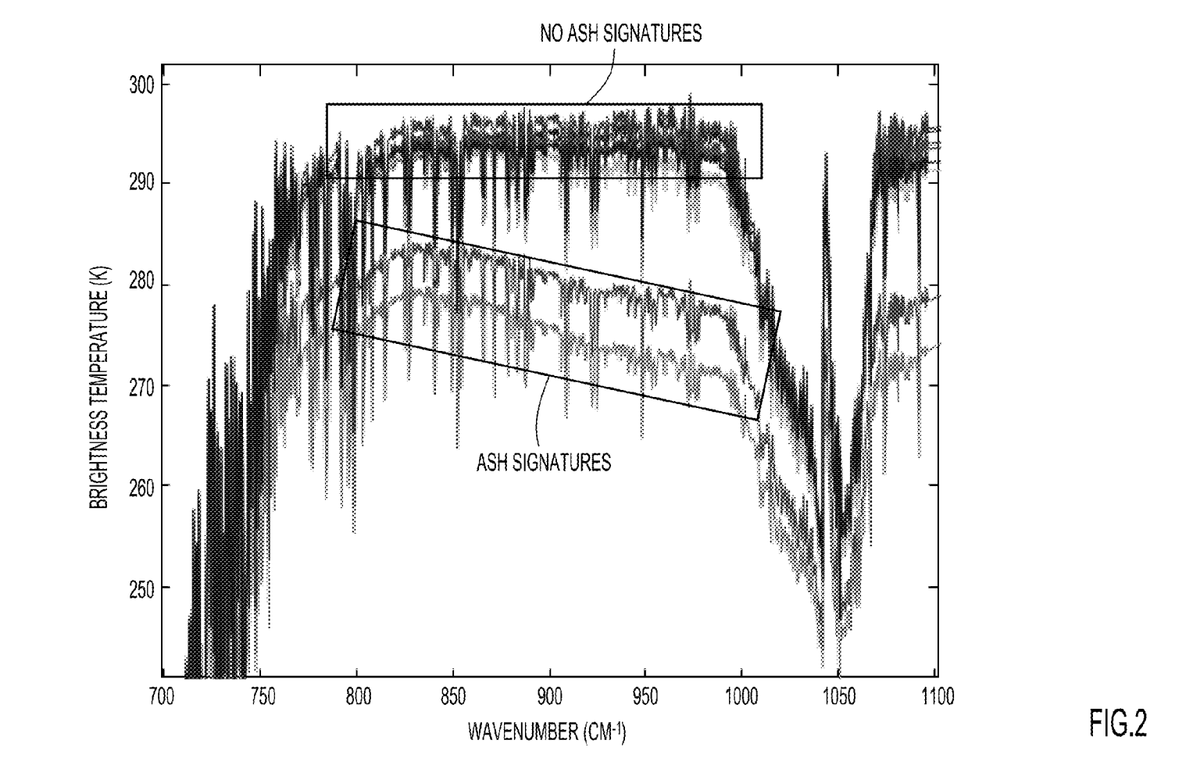
FIG. 2 is a plot of CrIS-obtained longwave infrared Brightness Temperature (K) Spectra vs. wavenumber ($cm^{-1}$) for a field of regard (FOR) associated with an active volcano in which different fields of view (FOVs) identify ash signatures and non-ash signatures.

An example of a CrIS FOR that measures spectral radiance based upon brightness temperature (K) over a spectral range is depicted in FIG. 2. This data was obtained from measurements by CrIS taken on Apr. 20, 2012 over a region in Mexico in which the FOR encompasses the active volcano El Popocatépetl, which was erupting at the time the spectral radiance data was obtained. The spectral radiance data plotted in FIG. 2 represents both ash and non-ash signatures within the 9 FOVs measured within the FOR by the CrIS (where the FOVs containing ash or no ash signatures are indicated in the figure). The techniques herein utilize spectral radiance measurements obtained from the CrIS (or other suitable instrument) within a specified range, such as within a wavenumber range from about 650 $cm^{-1}$ to about 1300 $cm^{-1}$. As described herein, and as shown in the data plots of the figures, this range provides a clear separation between FOV plots with no-ash signatures and FOV plots with ash signatures.

Example techniques of automatic identification by the system 2, utilizing one or more software applications from the spectral radiance data processing module 10, are now described with reference to the flowcharts of FIGS. 3 and 4. Referring to the flowchart of FIG. 3, at 30, spectral radiance data is obtained (e.g., from the CrIS instrument on the Suomi-NPP satellite) that includes brightness temperature data over a specified spectral range from a plurality of FOVs for a particular FOR. As previously noted, the CrIS instrument provides 9 FOVs in a given FOR. The data plotted in FIG. 2 shows brightness temperature over a spectral range from about 700 $cm^{-1}$ to about 1100 $cm^{-1}$ for the 9 FOVs defined within a particular FOR (where the FOR encompasses the volcano El Popocatépetl, and the measurements were obtained at a time this volcano was active and releasing ash to the atmosphere). This data is obtained by the system 2 directly from the satellite 20 or indirectly from the satellite 20 (e.g., obtained from another, intermediate system that obtains date from the satellite 20 and provides the information to system 2). This obtained data is used to identify the potential presence of ash as described herein.

At 35, a baseline spectrum is determined for comparing data from the different FOVs in order to determine which one or more FOVs is associated with volcanic ash. The plotted data (brightness temperature vs. wavenumber) is first analyzed to determine which spectral plot has the flattest spectral slope in a specific wavenumber range (e.g., within the 820 $cm^{-1}$ to 985 $cm^{-1}$ range, which can be seen from the data plot of FIG. 2 in which the spectral slopes of at least some of the FOVs become relatively flat). The FOV of the 9 FOVs having the flattest slope (e.g., a spectral slope that is less than or equal to 2K) is utilized as the baseline spectrum with which all FOVs are compared. In the event no FOV has associated spectral data having a slope that is within a predetermined range (e.g., the spectral slopes for each of the FOVs is greater than 2K, indicating no FOV has a sufficiently flat slope within the spectral range), then a baseline spectrum is obtained from an FOV of a neighboring FOR that meets the above requirement. The baseline spectrum (e.g., determined as an FOV having the flattest slope) is assumed to represent no ash present.

Figure 5:
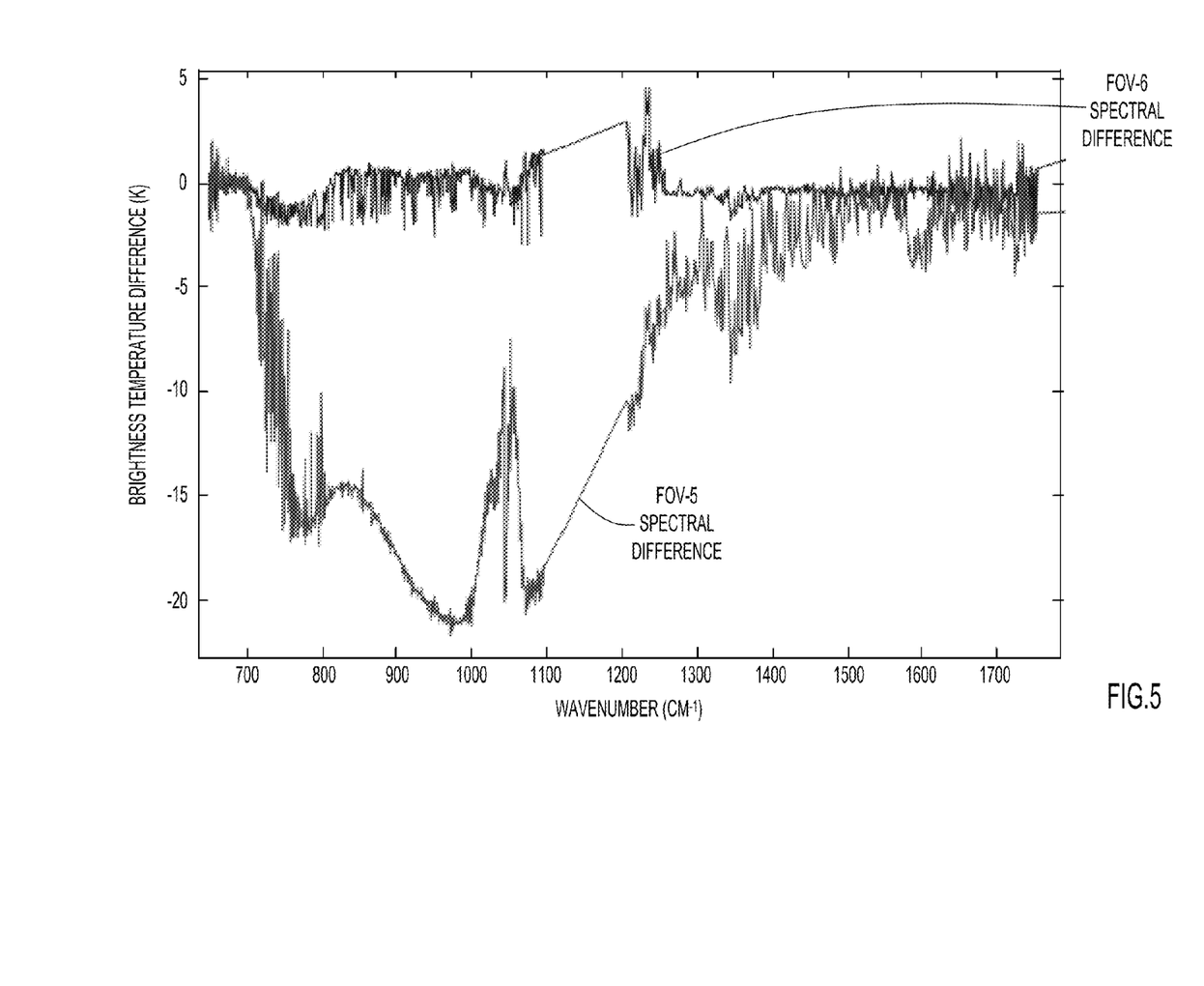
FIG. 5 is a plot of CrIS-obtained longwave infrared Brightness Temperature (K) Spectra Difference for selected fields of view (FOVs), where the data is obtained from the data plotted in FIG. 2.

At 40, a spectral difference is determined between the baseline radiance (determined from the previous step 35) and the radiance spectrum for each FOV, where the spectral difference is then plotted within the spectral range for each FOV. Referring to FIG. 5, Brightness Temperature Difference (K) is plotted based upon wavenumber for selected FOVs, where this information is taken from the data as plotted in FIG. 2. In particular, the brightness temperature data for FOV-9 from the FOR has been determined as the no ash present baseline spectrum according to the previous step (step 35), and the radiance spectrum for each FOV is compared with this baseline spectrum to determine a spectral difference for each FOV. The plot in FIG. 5 compares difference in brightness temperatures over the wavenumber range of one FOV, FOV-5, with the baseline spectrum from FOV-9 (previously determined as a baseline spectrum based upon its flat spectral slope). A spectral difference is also plotted between FOV-6 and FOV-9. As can be seen from the data plots in FIG. 5, the spectral difference between FOV-5 and FOV-9 is much greater in the wavenumber range of about 700 $cm^{-1}$ to about 1300 $cm^{-1}$, whereas the spectral difference between FOV-6 and FOV-9 over the same range is much smaller (where the plot hovers at about zero difference). The spectral difference between FOV-5 and FOV-9 is similar to the imaginary index of refraction for andecite ash in relative shape and amplitude in the 800-1200 $cm^{-1}$ window region (ignoring ozone contamination), as described by Pavolonis, et al., *A Daytime Complement to the Reverse Absorption Technique for Improved Automated Detection of Volcanic Ash, J Atmos OceanTech*, 23, p. 1422. Spectral difference plots, such as those plotted for FOV-5 and FOV-6, are plotted for every FOV within the FOR vs. the baseline spectrum.

At 45, the spectral slopes of the spectral difference plots are determined within one or more spectral ranges. In particular, the spectral slopes for the spectral difference plots at each FOV can be determined within a range of about 820-985 $cm^{-1}$ and also about 1078-1231 $cm^{-1}$. These ranges have been determined for a number of active volcanoes (e.g., based upon measurements by the Infrared Atmospheric Sounding Interferometer and laboratory measurements of ash reflectivity) to provide spectral data having a sufficient signatures for determining a spectral slope. Alternatively, spectral slopes can also be analyzed within any other suitable wavenumber ranges where ash is observed to have a distinct and measurable spectral signature. The difference spectra are used to increase sensitivity and lower the threshold for which an ash containing FOV is identified.

At 50, a determination is made regarding whether any of the spectral slopes for the spectral difference plots within the selected range or ranges for each FOV is greater than a threshold value (e.g., slope>1). In response to no spectral slope within any selected wavenumber range of a spectral difference plot being greater than the threshold value for an FOV, the FOV is assigned an indication at 55 that no volcanic ash is detected within FOV. However, in response to at least one spectral slope within any selected wavenumber range of the spectral difference plot for an FOV being greater than the threshold value, this FOV is assigned an indication at 60 that a volcanic ash plume is detected for this FOV. Referring again to FIG. 5, FOV-6, which has a spectral difference plot including a relatively flat slope within the 820-985 $cm^{-1}$ and 1078-1231 $cm^{-1}$ ranges, is assigned an indication of no volcanic ash detected. In contrast, FOV-5, which has a spectral difference plot within the same wavenumber ranges that has a slope significantly greater than 1, is assigned an indication of a volcanic ash plume being detected.

Figure 3:
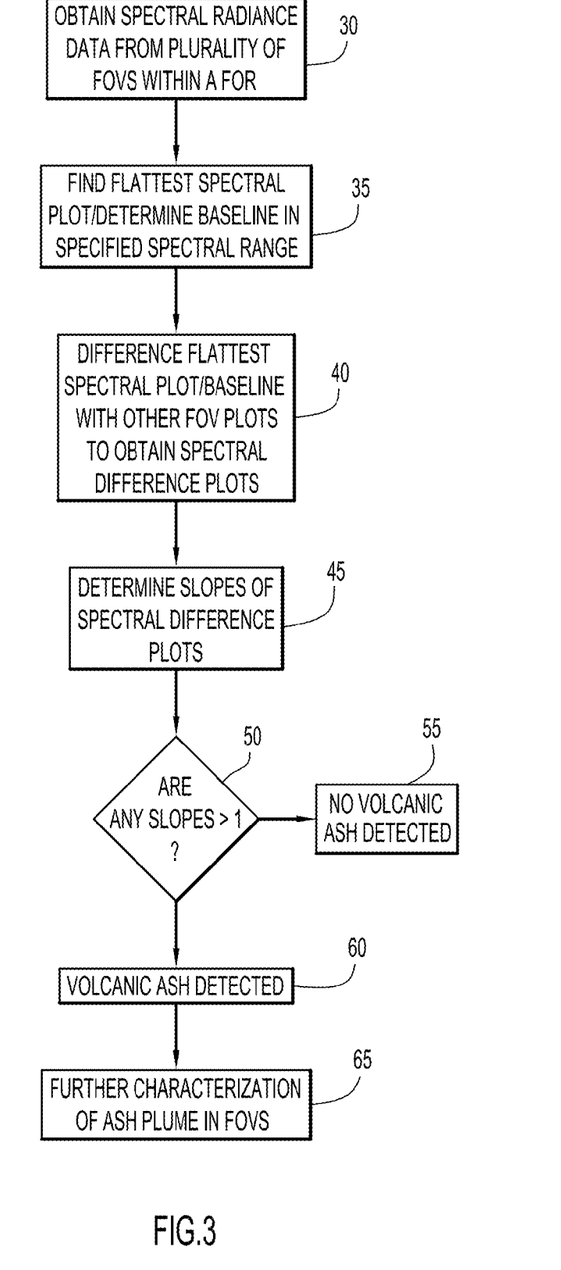
FIG. 3 is a flow chart depicting an example technique for identification of an ash plume within a particular field of regard utilizing spectral measurements taken within the field of regard.
Figure 4:
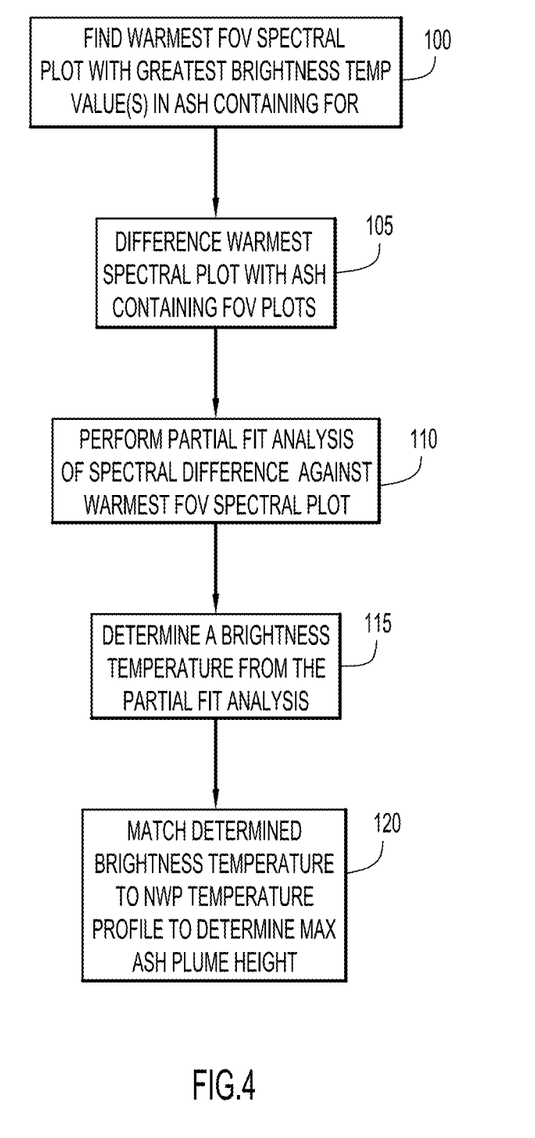
FIG. 4 is a flow chart depicting an example technique for determination of an ash plume height utilizing the same spectral measurements for the same field of regard and based upon a determination that an ash plume is present from the example technique depicted in FIG. 4.

The FOVs that have been determined as including volcanic ash, based upon the previous techniques as depicted in the flowchart of FIG. 3, can be evaluated to further characterize the volcanic ash plume that has been detected within the FOR. For example, techniques as set forth in the flowchart of FIG. 4 can be utilized to determine a height of the volcanic ash plume within FOVs determined as containing volcanic ash. The ash plume height temperature can be determined by finding the location where the ash and no ash spectral signatures become equal, such as in the $CO_2$ band near 700 $cm^{-1}$.

For FOVs identified as containing volcanic ash, an ash plume top height assignment is made. At 100 (FIG. 4), the FOV spectrum with the warmest window region temperature (i.e., the greatest brightness temperature) in an ash containing FOR is determined. At 105, the identified FOV spectrum having the greatest brightness temperature is differenced from the ash containing FOV spectra. At 110, the difference spectrum is partially fit against the warm spectrum and, at 115, the ash plume top height is determined by finding the brightness temperature from the partial fit analysis. The partial fit analysis is performed to find the greatest brightness temperature at which the identified volcanic ash FOV plots converge with the identified non-volcanic ash FOV plots (e.g., the FOV plots as shown in FIG. 2, where the greatest brightness temperature values of the ash signature and no ash signature plots converge within the 700-800 $cm^{-1}$ range).

Figure 6:
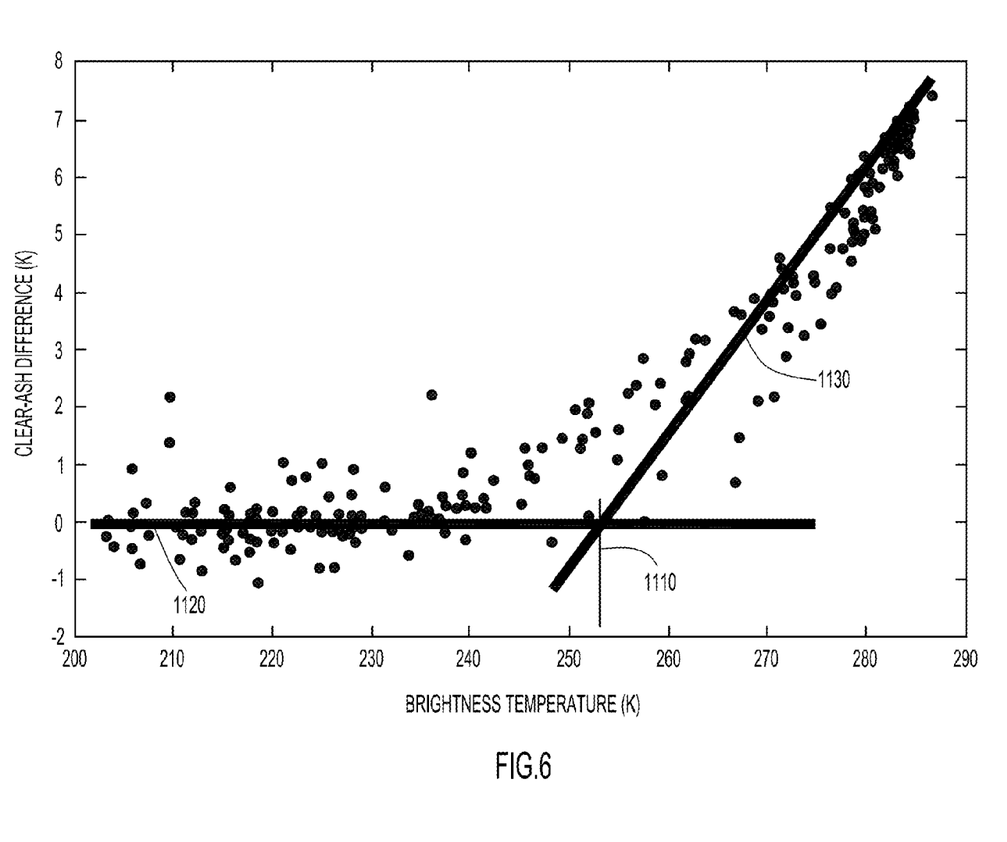
FIG. 6 is a plot of Clear-Ash FOV Brightness temperature difference vs. Clear FOV Brightness temperature based upon FOV spectral radiance data acquired from FIG. 2, and in which a partial fit of two linear functions provides a Brightness temperature value at the converging linear functions.
Figure 7:
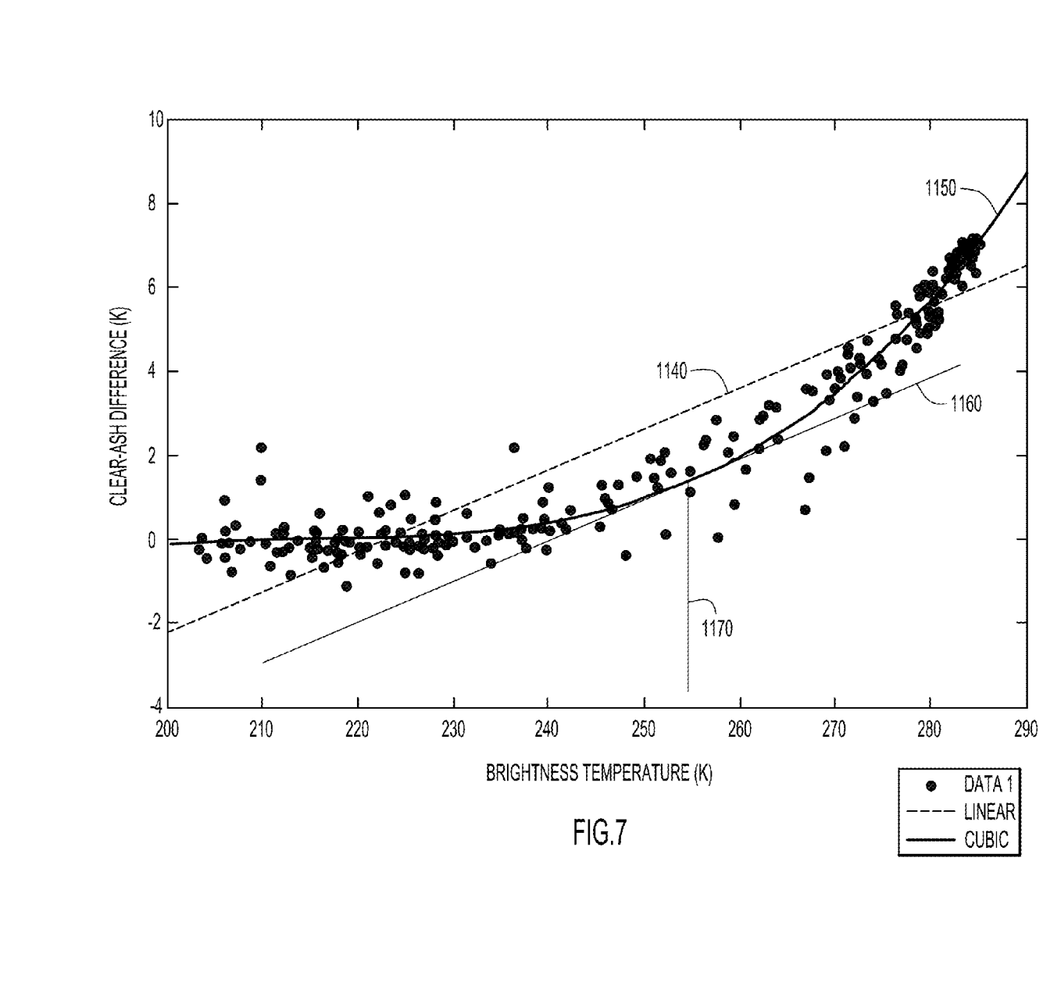
FIG. 7 is a plot of Clear-Ash FOV Brightness temperature difference vs. Clear FOV Brightness temperature based upon FOV spectral radiance data acquired from FIG. 2, and in which a fit of a linear function and a cubic function are utilized to provide a Brightness temperature value at the converging lines defined at equal slopes of the two functions.

Two examples of performing partial fit analysis and finding the brightness temperature associated with the ash plume top height are depicted in FIGS. 6 and 7, where the data for these data plots is again obtained from the data plotted in FIG. 2 and further from analysis to identify which FOVs of this data plot contain volcanic ash. Each of FIGS. 6 and 7 includes the same plot of data points, in which a FOV is identified as having the greatest brightness temperature value(s). The spectral radiance data for all of the other FOVs is then compared against this identified high brightness temperature FOV by determining a temperature difference between each FOV and the identified high brightness temperature FOV. Each data point within FIGS. 6 and 7 shows the temperature difference between an FOV and the identified high brightness temperature FOV at each brightness temperature value of the identified high brightness temperature FOV (where temperature difference is shown on the y-axis and the brightness temperature of the identified high brightness temperature FOV is on the x-axis).

In FIG. 6, two linear functions are partially fit using data from either end of the brightness temperature regions, shown as lines 1110 and 1120. The intersection of these two lines 1110 and 1120, shown as line 1130, provides a brightness temperature that corresponds with the apex or maximum height of the volcanic ash plume (e.g., 252 K). In FIG. 7, a second fit method is utilized on the same plot of data, in which a linear function (represented by line 1140) is fit using the entire data range, and a cubic function (represented by curve 1150) is also fit using the entire data range. A determination is made where a line 1160 that is tangent to the cubic function curve 1150 has a slope that matches or is equal to the slope of the line 1140. The point defined at the tangent between line 1160 and curve 1150 (represented by line 1170) provides a brightness temperature that also corresponds with the apex or maximum height of the volcanic ash plume (e.g., 254 K). The two methods can be compared to determine how close the two brightness temperature values are. In the event the two values deviate by no more than a maximum amount (e.g., no more than 3K of difference), an average between the two values can be utilized to obtain a final brightness temperature value that corresponds with the maximum volcanic ash plume height (e.g., 253 K).

At 120, the maximum ash plume height is determined utilizing the brightness temperature value identified as being associated with the maximum ash plume height. Any suitable models for correlating temperature with atmospheric conditions, including height, can be utilized to correlate the brightness temperature value at a given time and location (i.e., a specific global latitude/longitude position that corresponds with the FOV from which the brightness temperature value is taken) with a specific altitude or height from the earth surface. In an example embodiment, the brightness temperature value is compared with vertical temperature profiles, in particular vertical temperature profiles extracted from Numerical Weather Prediction models analyses for the region encompassed by the FOR at the historical time period and specific FOR where the spectral radiance measurements were obtained. The vertical temperature profiles correlate temperature with height at the precise global location. From this information, a maximum ash plume height can be correlated with the brightness temperature value. For the data associated with FIG. 2, in which the brightness temperature value identified as being associated with the maximum ash plume height is determined to be 253 K (e.g., utilizing the techniques depicted in FIG. 4, with partial fit analyses being performed as depicted in FIGS. 6 and 7), the ash plume height associated with this temperature value (using vertical temperature profiles for this specific region and at the specific time period) is about 32,000 feet.

Thus, the systems and techniques described herein facilitate automatic identification as well as classification of volcanic ash within a particular area or FOR. The classification can include a determination of maximum ash plume height. Other types of classification are also possible, including ash type classification of the suspended soil-based aerosols within the ash plume based upon the shapes of the difference spectrum, where the shapes of the difference spectrum can be compared with spectrum associated with other, known aerosol suspensions to identify similarities thus identifying types of particulates within the suspensions. The ash classification algorithm uses a matched filter method to find the best match between the observed difference spectrum discussed above and a library of known types of ash emissivity spectra. For example, dust clouds, such as dust clouds from the Saharan desert, can be identified within difference spectrum associated with FOVs and filtered out in order to help identified other types of particulate materials within the suspension.

Having described example embodiments for automatic identification of volcanic ash plumes using measured spectral radiance over a plurality of field of views (FOVs), variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of identifying volcanic ash within a field of regard (FOR), the FOR including a plurality of field of views, the method comprising:
   obtaining spectral radiance data comprising brightness temperature values over a specified spectral range for each field of view (FOV) within the FOR;
   determining a baseline brightness temperature value over the specified spectral range that is identified as representing no volcanic ash; and
   assigning one or more FOVs having brightness temperature values that deviate from the baseline brightness temperature value by a predetermined amount with an indication of containing volcanic ash.

2. The method of claim 1, wherein determining the baseline brightness temperature value comprises:
   determining a spectral slope within a sub-range of the specified spectral range for each of the FOVs based upon a plot of brightness temperature vs. wavenumber for each FOV;
   determining a baseline FOV as the FOV having the smallest spectral slope within the sub-range in comparison to each of the other FOVs; and
   assigning the baseline brightness temperature value as a brightness temperature value that corresponds with the smallest spectral slope of the baseline FOV.

3. The method of claim 1, further comprising:
   further characterizing the FOVs determined as containing volcanic ash based upon at least one of ash type and height of ash plume.

4. The method of claim 3, wherein the further characterizing further comprises:
   determining a height-indicating brightness temperature value at which plots of spectral radiance data between a first FOV assigned as containing volcanic ash and another FOV not assigned as containing volcanic ash converge;
   obtaining temperature profile information that correlates temperature with surface height at a time and a location that corresponds with the spectral radiance data associated with the first FOV; and
   correlating the height-indicated brightness temperature value with a surface height using the temperature profile information to obtain a maximum height of volcanic ash associated with the first FOV.

5. The method of claim 1, wherein the spectral radiance data comprise CrIS measurements.

6. The method of claim 1, wherein the determining the baseline brightness temperature value and the assigning one or more FOVs with an indication of containing volcanic ash is achieved automatically via a processor.

7. A system for identifying volcanic ash within a field of regard (FOR), the FOR including a plurality of field of views, the system comprising:
   a memory configured to store instructions including one or more spectral radiance data processing applications; and
   a processor configured to execute and control operations of the one or more spectral radiance data processing applications so as to:
      obtain spectral radiance data comprising brightness temperature values over a specified spectral range for each field of view (FOV) within the FOR;
      determine a baseline brightness temperature value over the specified spectral range that is identified as representing no volcanic ash; and
      assign one or more FOVs having brightness temperature values that deviate from the baseline brightness temperature value by a predetermined amount with an indication of containing volcanic ash.

8. The system of claim 7, wherein the processor is configured to determine the baseline brightness temperature value by:
   determining a spectral slope within a sub-range of the specified spectral range for each of the FOVs based upon a plot of brightness temperature vs. wavenumber for each FOV;

determining a baseline FOV as the FOV having the smallest spectral slope within the sub-range in comparison to each of the other FOVs; and assigning the baseline brightness temperature value as a brightness temperature value that corresponds with the smallest spectral slope of the baseline FOV.

9. The system of claim 7, wherein the processor is further configured to execute and control operations of the one or more spectral radiance data processing applications so as to:

further characterize the FOVs determined as containing volcanic ash based upon at least one of ash type and height of ash plume.

10. The system of claim 9, wherein the processor is configured to further characterize the FOVs determined as containing volcanic ash by:

determining a height-indicating brightness temperature value at which plots of spectral radiance data between a first FOV assigned as containing volcanic ash and another FOV not assigned as containing volcanic ash converge;

obtaining temperature profile information that correlates temperature with surface height at a time and a location that corresponds with the spectral radiance data associated with the first FOV; and correlating the height-indicated brightness temperature value with a surface height using the temperature profile information to obtain a maximum height of volcanic ash associated with the first FOV.

11. The system of claim 7, wherein the spectral radiance data obtained by the system comprise CrIS measurements.

12. One or more computer readable storage media to identify volcanic ash within a field of regard (FOR), the FOR including a plurality of field of views, the one or more computer readable storage media encoded with software comprising computer executable instructions and when the software is executed operable to:

obtain spectral radiance data comprising brightness temperature values over a specified spectral range for each field of view (FOV) within the FOR;

determine a baseline brightness temperature value over the specified spectral range that is identified as representing no volcanic ash; and assign one or more FOVs having brightness temperature values that deviate from the baseline brightness temperature value by a predetermined amount with an indication of containing volcanic ash.

13. The computer readable storage media of claim 12, wherein the instructions are further operable to determine the baseline brightness temperature value by:

determining a spectral slope within a sub-range of the specified spectral range for each of the FOVs based upon a plot of brightness temperature vs. wavenumber for each FOV;

determining a baseline FOV as the FOV having the smallest spectral slope within the sub-range in comparison to each of the other FOVs; and assigning the baseline brightness temperature value as a brightness temperature value that corresponds with the smallest spectral slope of the baseline FOV.

14. The computer readable storage media of claim 12, wherein the instructions are further operable to:

further characterize the FOVs determined as containing volcanic ash based upon at least one of ash type and height of ash plume.

15. The computer readable storage media of claim 14, wherein the instructions are further operable to further characterize the FOVs determined as containing volcanic ash by:

determining a height-indicating brightness temperature value at which plots of spectral radiance data between a first FOV assigned as containing volcanic ash and another FOV not assigned as containing volcanic ash converge;

obtaining temperature profile information that correlates temperature with surface height at a time and a location that corresponds with the spectral radiance data associated with the first FOV; and correlating the height-indicated brightness temperature value with a surface height using the temperature profile information to obtain a maximum height of volcanic ash associated with the first FOV.

16. The computer readable storage media of claim 12, wherein the spectral radiance data comprise CrIS measurements.

17. The method of claim 1, wherein the FOR comprises a three-dimensional array defined by the FOVs with spectral radiance data being obtained within the three-dimensional array.

18. The system of claim 7, wherein the FOR comprises a three-dimensional array defined by the FOVs with spectral radiance data being obtained within the three-dimensional array.

19. The computer readable storage media of claim 12, wherein the FOR comprises a three-dimensional array defined by the FOVs with spectral radiance data being obtained within the three-dimensional array.

* * * * *